United States Patent
Cheng

(10) Patent No.: US 8,866,825 B2
(45) Date of Patent: Oct. 21, 2014

(54) MULTIPLE DISPLAY FRAME RENDERING METHOD AND APPARATUS

(75) Inventor: Jeffrey G. Cheng, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 372 days.

(21) Appl. No.: 12/968,636

(22) Filed: Dec. 15, 2010

(65) Prior Publication Data

US 2012/0154411 A1 Jun. 21, 2012

(51) Int. Cl.
*G06F 15/80* (2006.01)
*G06T 1/20* (2006.01)

(52) U.S. Cl.
CPC ........................................ *G06T 1/20* (2013.01)
USPC ............................ 345/505; 345/502; 345/506

(58) Field of Classification Search
CPC .... G06T 1/20; G06T 15/005; G09G 2360/04; G09G 2360/06
USPC ......... 345/502, 504, 505, 541, 545, 554, 903, 345/539
See application file for complete search history.

(56) References Cited

U.S. PATENT DOCUMENTS

| | | | |
|---|---|---|---|
| 4,495,594 A | 1/1985 | Eggebrecht et al. | |
| 4,760,388 A | 7/1988 | Tatsumi et al. | |
| 5,610,622 A | 3/1997 | Takeda et al. | |
| 5,963,200 A | 10/1999 | Deering et al. | |
| 6,122,000 A | 9/2000 | Yee et al. | |
| 6,157,395 A | 12/2000 | Alcorn | |
| 7,995,003 B1* | 8/2011 | Diard et al. | 345/1.3 |
| 2008/0238917 A1* | 10/2008 | Bakalash et al. | 345/419 |
| 2010/0053176 A1* | 3/2010 | Koduri et al. | 345/502 |
| 2010/0238188 A1* | 9/2010 | Miceli | 345/582 |

OTHER PUBLICATIONS

Shimpi, Anand L. "AnandTech—Beginnings of the Holodeck: AMD's DX11 GPU, Eyefinity and 6 Display Outputs." AnandTech. N.p., Sep. 10, 2009.*

* cited by examiner

*Primary Examiner* — Xiao Wu
*Assistant Examiner* — Scott E Sonners
(74) *Attorney, Agent, or Firm* — Faegre Baker Daniels LLP

(57) ABSTRACT

An apparatus includes a plurality of image processing circuits. Each image processing circuit generates an image frame corresponding to a single large surface. The first image processing circuit provides a portion of the generated image frame for a first display or plurality of displays and provides a remaining portion of the image frame to the remaining image processing circuits. The next image processing circuits provides the remaining portion of the image frame for the next plurality of displays.

16 Claims, 4 Drawing Sheets

MULTIPLE DISPLAY FRAME RENDERING METHOD AND APPARATUS

FIELD

The present disclosure generally relates to image frame rendering, and more particularly, to image frame rendering for multiple displays driven by multiple graphics processors.

BACKGROUND

Applications employ multiple displays driven by multiple image processing circuits, one example of which are graphics processors (GPU), each of which can include multiple displays. One of the applications is to display a single image amongst the multiple displays driven separately by the multiple GPUs. One implementation of the application is to employ a single memory buffer, which is called single large surface, to render and to store the digital image in the GPU frame buffer for display. Using a single large surface allows software to render a digital image in the same way as the single display configuration and without specific knowledge of the underline display and GPU connection topology.

Stated another way, in a computer system there can be multiple graphics processors (GPU) installed, each of the GPUs may or may not have its own display connectors, driving multiple display devices (monitors). A GPU drives its display outputs from buffers (primary surfaces) in video memory.

One known method, where multiple monitors are driven by a single GPU, uses a set of primary surfaces across multiple displays in the GPU's video memory. The GPU maps a partition of each primary surface to each of the displays as if the partition was a distinct surface. As such, images are presented from a single large surface encompassing all the partitions corresponding to all the monitors. However, this method is only applicable to apparatuses where a single GPU drives multiple displays, resulting in limited number of total displays supported by the apparatus. This method also has the limitation of supporting a single GPU as the rendering processor, resulting in limited processing performance provided by a single GPU instead of increased processing performance collectively provided by multiple GPUs, e.g. Alternate Frame Rendering by multiple GPUs.

In another known method using multiple GPUs, each GPU renders the image to its own memory buffer (e.g., primary surface) as a part of the single large surface. As such, the each primary surface is allocated separately in each GPUs frame buffer memory and is not sharable. The rendering program is required to recognize the GPU and display topology to separately render to each of the primary surfaces, and to compose the entire image using individual display controls in each GPU to synchronously display the image. This method requires complex software implementation that employs different programming logics according to different number of GPUs and the locality of the multiple displays.

If a graphics application wants to display a single frame of graphics/video content across multiple monitors, it is required to separately render to individual primary surfaces responding to multiple monitors. After all portions of a frame are finished with rendering, the application is required to display the composted entire frame from multiple buffers. Rendering and managing all if the primary surfaces requires specific knowledge about the display topology and handling logic in the executing application software.

When multiple monitors are driven by a single GPU, an existing solution to make applications transparent to the multiple monitors and the display topology is to use a single set of primary surfaces across multiple monitors in the GPU's video memory. The display driver maps a partition of the primary surface to each of the monitors as if the partition was a distinct surface. The applications are presented with a single large surface (SLS) encompassing all the partitions corresponding to all the monitors.

In addition, another possible prior art solution would be to use another multi-GPU rendering technique called SFR, or Split Frame Rendering. Each GPU is responsible for rendering a portion of the frame corresponding to the monitors connected to the GPU's local display connector. Every frame is collectively rendered by all GPUs. This solution is not a preferred multi-GPU rendering mode due to lower performance since all GPUs are involved in rendering every frame. Data required for rendering each frame need to be made available to all GPU every frame, causing large amount of data traffic across the GPUs via the interconnect bus. The sum of all GPUs' workloads can involve a large processing overhead.

Accordingly, there is a need to overcome one or more of the aforementioned drawbacks.

BRIEF DESCRIPTION OF THE DRAWINGS

The invention will be more readily understood in view of the following description when accompanied by the below figures, wherein like reference numerals represent like elements.

DETAILED DESCRIPTION

Figure 1:
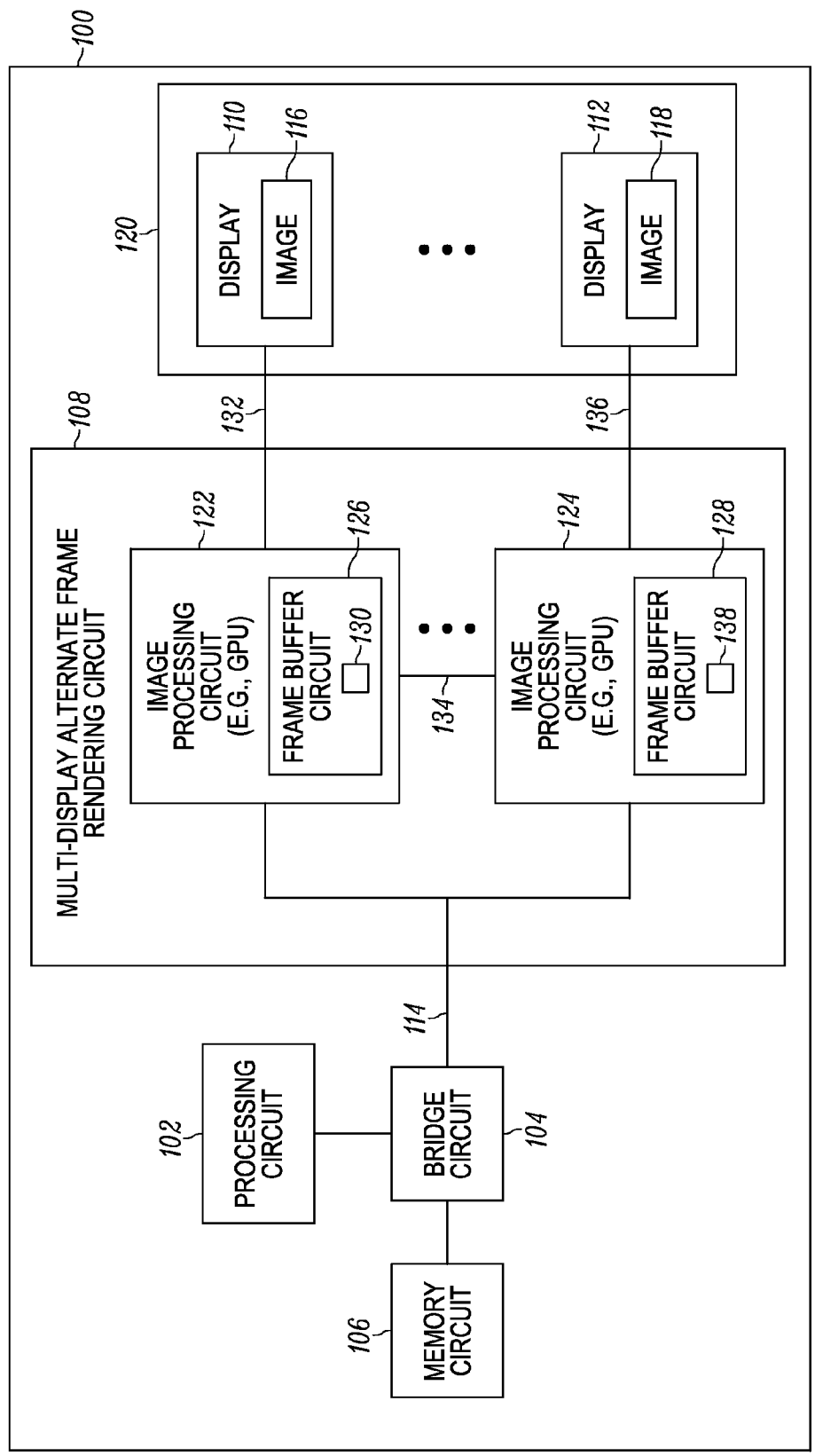
FIG. 1 is an exemplary block diagram of a device having a multi-display alternate frame rendering circuit according to the present disclosure.

In one example, an apparatus includes a first image processing circuit and a second image processing circuit. The first image processing circuit generates an entire image frame corresponding to a single large surface. The first image processing circuit provides a portion of the entire image frame for a first display or plurality of displays and provides a remaining portion of the image frame to the second image processing circuit. The second image processing circuit then provides the remaining portion of the image frame for a second display or plurality of displays. A related method is also disclosed.

By way of one example, if image processing circuits are graphics processing circuits (e.g., cores), each GPU may be connected to three displays for a six display layout, two GPUs drive their own displays from their own video memories. Hence, the first image processing circuit is connected to a subset of the total plurality of displays in the apparatus. The second image processing circuit is connected to the remaining subset of the total plurality of displays in the apparatus. A set of single large surfaces is mirrored by the two GPUs. The two GPUs alternatively render even and odd frames in a collaborative fashion, known as "AFR" or Alternate Frame Rendering. After GPU1 has finished rendering an even frame (N), it makes a peer-to-peer copy to GPU2 for the portion of the frame corresponded to the monitors connected to GPU2 (e.g., half of a frame if GPU2 is connected to half of the monitors). The actual portion of the frame to be copied corresponds to the monitors connected to GPU2—the frame could be either horizontal split or vertical split depending on the monitor connection topology. Likewise, after GPU2 has finished rendering an odd frame (N+1), it makes a peer-to-peer copy to GPU1 for the other half of the frame.

The method and apparatus, among other advantages, provides an image frame that can be collectively displayed among a plurality of displays to present a single image from a single large surface in frame buffer memory. It allows a rendering program to always employ single control logic to render an entire image, without needing to manage individual GPUs and display topology. In addition, the method and apparatus includes multiple image processing circuits that can multitask image processing in order to speed up image frame processing. Other advantages will be recognized by those of ordinary skill in the art.

In one example, the first image processing circuit provides the remaining portion of the image frame for the first plurality of displays after the second image processing circuit has presented a previous remaining portion of a previous image frame for the second plurality of displays. The previous image frame corresponds to the single large surface.

In one example, the second image processing circuit generates a second image frame concurrent with the first image processing circuit generating a third image frame. The first image processing circuit provides a second portion of the second image frame for the first plurality of displays. The second image processing circuit provides a second remaining portion of the second image frame for the second plurality of displays.

In one example, the first image processing circuit provides the portion of the image frame for the first plurality of displays concurrently with the second image processing circuit providing the remaining portion of the image frame for the second plurality of displays. In one example, the first image processing circuit provides the portion of the image frame for the first plurality of displays after the second processing circuit receives the remaining portion of the image frame.

As used herein, the term "circuit" can include an electronic circuit, one or more processing cores (e.g., shared, dedicated, or group of processing cores such as but not limited to microprocessors, digital signal processors, graphics processing units, or central processing units) and memory that execute one or more software or firmware programs, combinational logic circuits, an application specific integrated circuit, and/or other suitable components that provide the described functionality. Additionally, as will be appreciated by those of ordinary skill in the art, the operation, design, and organization, of a "circuit" can be described in a hardware description language such as Verilog™, VHDL, or other suitable hardware description languages.

Referring now to FIG. 1, an exemplary functional block diagram of a device 100 such as a wireless phone, a mobile and/or stationary computer, a printer, a LAN interface (wireless and/or wired), a media player, a video decoder and/or encoder, and/or any other suitable device is depicted. The device 100 includes a primary processing circuit 102 (e.g., CPU), a bridge circuit 104 (e.g., Northbridge and/or Southbridge), a memory circuit 106, a multi-display alternate frame rendering circuit 108, and multiple displays 110, 112.

The primary processing circuit 102 is operatively coupled to the bridge circuit 104 and processes requests from the bridge circuit 104. The memory circuit 106 stores information communicated from the bridge circuit 104. The bridge circuit 104 communicates visual information 114 (e.g., drawing commands or other suitable visual information) to multi-display alternate frame rendering circuit 108, which processes the information for presentation on the displays 110, 112 as respective images 116, 118. More specifically, the displays 110, 112 collectively present the respective images 116, 118 as a single large surface 120.

The multi-display alternate frame rendering circuit 108 includes multiple image processing circuits 122, 124 operatively coupled to each other. Each of the image processing circuits 122, 124 include a respective frame buffer circuit 126, 128. During operation, the first image processing circuit 122 generates an image frame 130 corresponding with the single large surface 120. Thereafter, the first image processing circuit 116 provides a portion 132 of the image frame 130 for the first display(s) 110 and a remaining portion 134 of the image frame 130 to the second image processing circuit 124. The remaining portion 134 can be provided to the second image processing circuit 124 via any suitable means such as a bus (e.g., PCI, PCI Express, or other suitable bus) or other suitable means. In response thereto, the second image processing circuit 124 provides a remaining portion 136 of the image frame 130 for the second display(s) 112. The remaining portion 136 is based on the remaining portion 134. In some embodiments, the second processing circuit 124 can pass through the remaining portion 134 as the remaining portion 136.

The image processing circuits 122, 124 can multitask to speed up operation. For example, in one embodiment, the second processing circuit 124 can generate an image frame 138 concurrent with the first processing circuit 122 generating the image frame 130. The image processing circuits 122, 124 are synchronized so that the first image processing circuit 122 provides the portion 132 of the image frame 130 for the first plurality of display(s) 110 concurrently with the second image processing circuit 124 presenting the remaining portion 136 of the image frame 130 for the second plurality of display(s) 112 or vice versa. The synchronization prevents one of the image processing circuits 122, 124 from presenting a portion of new image frame before the other image processing circuit has received a portion of the same image frame 138. The new image frame is presented to memory 120 after both image processing circuits are ready to present the new image frame.

In one embodiment, each of the image processing circuits 122, 124 can create an synchronization object (e.g., a flag or other suitable object) when it is ready to present its respective portion of the image frame. Once all of the image processing circuits 122, 124 have created the synchronization object, the image processing circuits 122, 124 can simultaneously present its respective portion of the image frame.

Figure 2:
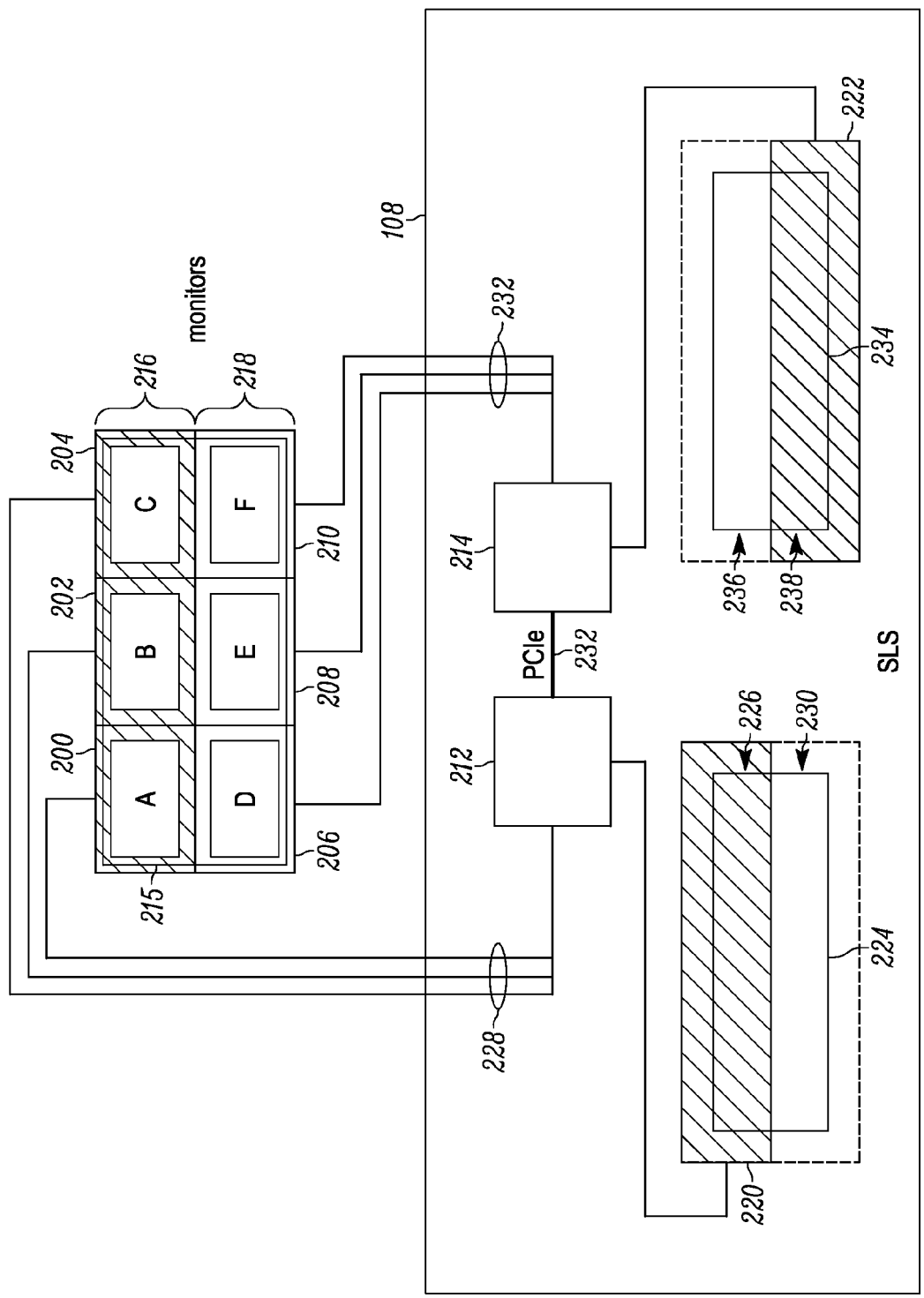
FIG. 2 is an exemplary block diagram of the multi-display alternate frame rendering circuit configured with six displays and two image processing circuits.

Referring now to FIG. 2, an exemplary functional block diagram of the multi-display alternate frame rendering circuit 108 configured with six displays 200, 202, 204, 206, 208, 210 and two image processing circuits 212, 214 is depicted. The displays 200, 202, 204, 206, 208, 210 collectively present image portions A, B, C, D, E, F as a single large surface 215. As shown, the first image processing circuit 212 is operative to provide image information to a first plurality of displays 216 (i.e., displays 200, 202, 204) and the second image processing circuit 214 is operative to provide image information to a second plurality of displays 218 (i.e., 206, 208, 210). In addition, each of the image processing circuits 212, 214 have a respective frame buffer circuit 220, 222 where the digital representation of the image 215 is located in a single large surface.

During operation, the first image processing circuit 212 processes an image frame 224 corresponding with the single large surface 215. Thereafter, the first image processing circuit 212 provides a portion 226 of the image frame 224 for the first displays 216 via path 228. Path 228 can be any suitable known connection between a graphics processing unit and a display such as DVI, HDMI, VGA, DisplayPort or other suitable connection. The first image processing circuit 212 provides a remaining portion 230 of the image frame 224 to the second image processing circuit 214 via a bus 232. The bus 232 can be any suitable bus such as PCI, PCI Express, or other suitable bus. In response thereto, the second image processing circuit 214 provides the remaining portion 230 of the image frame 224 for the second displays 218 via path 232. As with path 228, path 232 can be any suitable known connection between a graphics processing unit and a display such as DVI, HDMI, VGA, DisplayPort or other suitable connection.

In the meantime or thereafter, the second image processing circuit 214 processes another image frame 234 corresponding with the single large surface 215. The second image processing circuit 214 provides a portion 238 of the image frame 234 for the second displays 218 via path 232 and a remaining portion 236 of the image frame 234 to the first image processing circuit 212 via a bus 232. In response thereto, the first image processing circuit 212 provides the remaining portion 236 of the image frame 234 for the first displays 216 via path 228.

Figure 3:
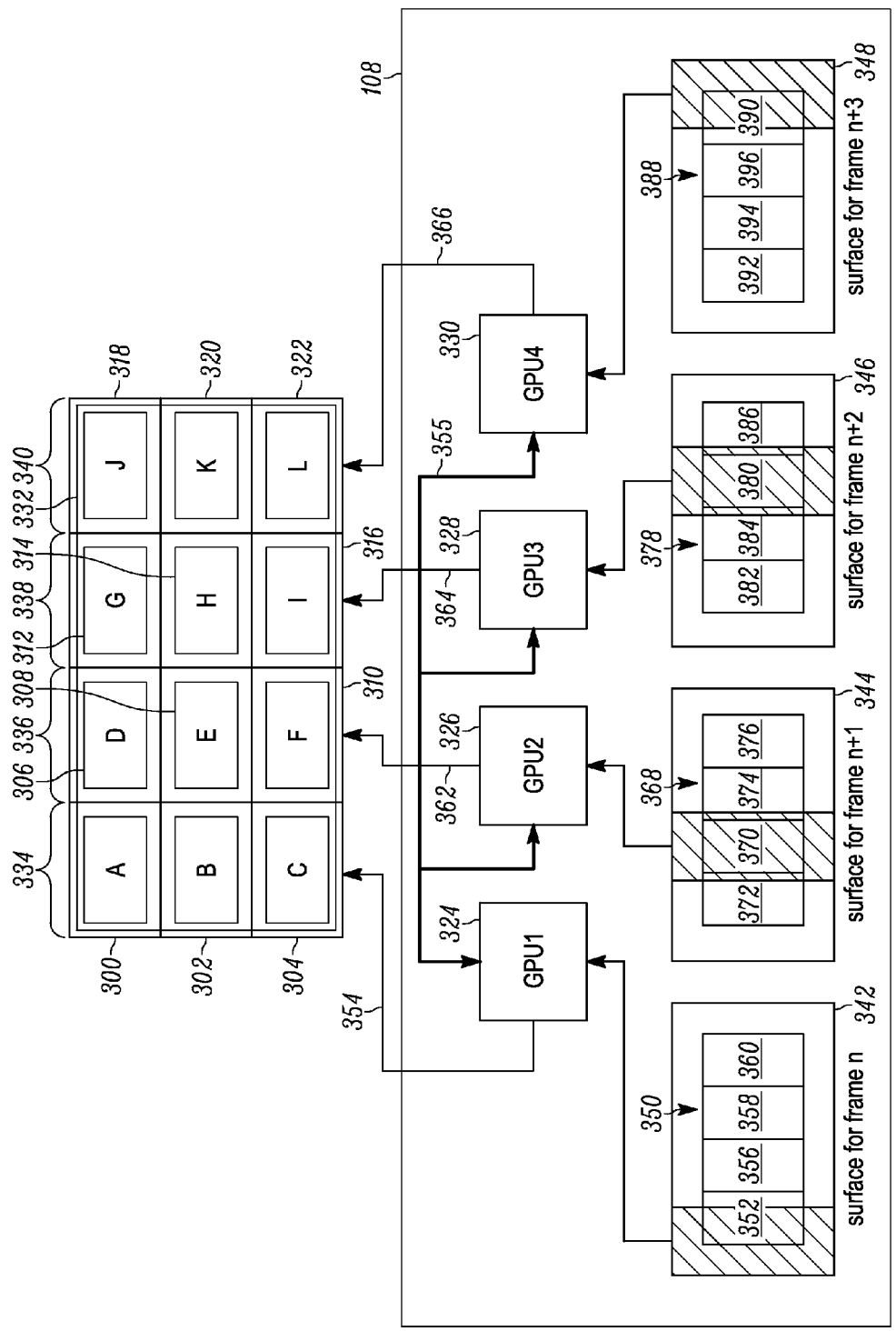
FIG. 3 is an exemplary block diagram of the multi-display alternate frame rendering circuit configured with twelve displays and four image processing circuits.

Referring now to FIG. 3, an exemplary functional block diagram of the multi-display alternate frame rendering circuit 108 configured with twelve displays 300, 302, 304, 306, 308, 310, 312, 314, 316, 318, 320, 322 and four image processing circuits 324, 326, 328, 330 is depicted. The displays 300, 302, 304, 306, 308, 310, 312, 314, 316, 318, 320, 322 collectively present image portions A, B, C, D, E, F, G, H, I, J, K, L as a single large surface 332. As shown, the first image processing circuit 324 is operative to provide image information to a first plurality of displays 334 (i.e., displays 300, 302, 304). The second image processing circuit 326 is operative to provide image information to a second plurality of displays 336 (i.e., 306, 308, 310). The third image processing circuit 324 is operative to provide image information to a third plurality of displays 338 (i.e., displays 312, 314, 316). The fourth image processing circuit 330 is operative to provide image information to a fourth plurality of displays 340 (i.e., displays 318, 320, 322). In addition, each of the image processing circuits 324, 326, 328, 330 have a respective frame buffer circuit 342, 344, 346, 348.

During operation, the first image processing circuit 324 processes an image frame 350 corresponding with the single large surface 332. Thereafter, the first image processing circuit 324 provides a portion 352 of the image frame 350 for the first displays 334 via path 354. Path 354 can be any suitable known connection between a graphics processing unit and a display such as DVI, HDMI, VGA, DisplayPort or other suitable connection. The first image processing circuit 324 provides, via a bus 355, a first remaining portion 356 of the image frame 350 to the second image processing circuit 326 a second remaining portion 358 of the image frame 350 to the third image processing circuit 328, and a third remaining portion 360 of the image frame to the fourth image processing circuit 330. The bus 355 can be any suitable bus such as PCI, PCI Express, or other suitable bus.

In response thereto, the second image processing circuit 326 provides the first remaining portion 356 of the image frame 350 for the second displays 336 via path 362. The third image processing circuit 328 provides the second remaining portion 358 of the image frame 350 for the third displays 338 via path 364. The fourth image processing circuit 330 provides the third remaining portion 360 of the image frame 350 for the fourth displays 3408 via path 366. As with paths 228 and 232, paths 354, 362, 364, 366 can be any suitable known connection between a graphics processing unit and a display such as DVI, HDMI, VGA, DisplayPort or other suitable connection.

In the meantime or thereafter, the second image processing circuit 326 processes an image frame 368 corresponding with the single large surface 332. The second image processing circuit 326 provides a portion 370 of the image frame 368 for the second displays 336. The second image processing circuit 326 provides, via the bus 355, a first remaining portion 372 of the image frame 368 to the first image processing circuit 324, a second remaining portion 374 of the image frame 368 to the third image processing circuit 328, and a third remaining portion 376 of the image frame 368 to the fourth image processing circuit 330.

In response thereto, the first image processing circuit 324 provides the first remaining portion 372 of the image frame 368 for the first displays 334 via path 354. The third image processing circuit 328 provides the second remaining portion 374 of the image frame 368 for the third displays 338 via path 364. The fourth image processing circuit 330 provides the third remaining portion 376 of the image frame 368 for the fourth displays 340 via path 366.

In the meantime or thereafter, the third image processing circuit 328 processes an image frame 378 corresponding with the single large surface 332. The third image processing circuit 328 provides a portion 380 of the image frame 378 for the third displays 338. The third image processing circuit 328 provides, via the bus 355, a first remaining portion 382 of the image frame 378 to the first image processing circuit 324, a second remaining portion 384 of the image frame 378 to the second image processing circuit 326, and a third remaining portion 386 of the image frame 378 to the fourth image processing circuit 330.

In response thereto, the first image processing circuit 324 provides the first remaining portion 382 of the image frame 368 for the first displays 334 via path 354. The second image processing circuit 326 provides the second remaining portion 384 of the image frame 368 for the second displays 336 via path 362. The fourth image processing circuit 330 provides the third remaining portion 386 of the image frame 378 for the fourth displays 340 via path 366.

In the meantime or thereafter, the fourth image processing circuit 330 processes an image frame 388 corresponding with the single large surface 332. The fourth image processing circuit 330 provides a portion 390 of the image frame 388 for the fourth displays 340. The fourth image processing circuit 330 provides, via the bus 355, a first remaining portion 390 of the image frame 388 to the first image processing circuit 324, a second remaining portion 394 of the image frame 388 to the second image processing circuit 326, and a third remaining portion 396 of the image frame 388 to the third image processing circuit 328.

In response thereto, the first image processing circuit 324 provides the first remaining portion 392 of the image frame 388 for the first displays 334 via path 354. The second image processing circuit 326 provides the second remaining portion 394 of the image frame 388 for the second displays 336 via path 362. The third image processing circuit 328 provides the third remaining portion 396 of the image frame 388 for the third displays 338 via path 364.

Figure 4:
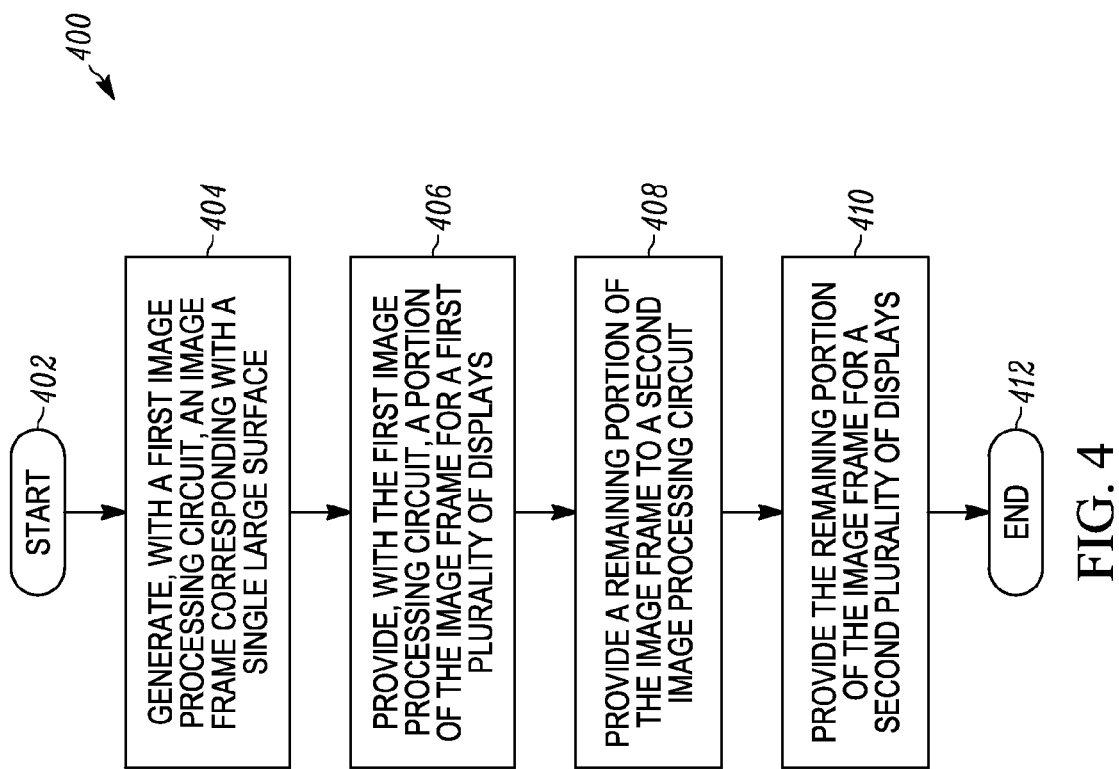
FIG. 4 is a flowchart depicting exemplary operations that can be performed by the multi-display alternate frame rendering circuit.

Referring now to FIG. 4, an exemplary flowchart depicting operations that can be performed by the multi-display alternate frame rendering circuit 108 are generally identified at 400. The process starts at 402. At 404, the multi-display alternate frame rendering circuit 108 processes, with a first image processing circuit, an image frame in response with a single large surface. At 406, the multi-display alternate frame rendering circuit 108 provides, with the first image processing circuit, a portion of the image frame for a first plurality of displays. At 408, the first image processing circuit provides a remaining portion of the image frame to a second image processing circuit of the multi-display alternate frame rendering circuit 108. At 410, the second image processing circuit provides the remaining portion of the image frame for a second plurality of displays. The process ends at 412. It will be recognized that the processes set forth may be performed simultaneously or alternately as desired.

As noted above, among other advantages, the method and apparatus provide an image frame that can be collectively displayed among a plurality of displays to present a single large surface. In addition, the method and apparatus include multiple image processing circuits that can multitask image processing in order to speed up image frame processing. Peer-to-peer copies of frame portions are used to facilitate alternate frame rendering among the multiple image processing circuits. Other advantages will be recognized by those of ordinary skill in the art.

While this disclosure includes particular examples, it is to be understood that the disclosure is not so limited. It will be recognized that claims directed to first and second image processing circuits can include at least two and can include more image processing circuits. Numerous modifications, changes, variations, substitutions, and equivalents will occur to those skilled in the art without departing from the spirit and scope of the present disclosure upon a study of the drawings, the specification, and the following claims.

What is claimed is:

1. An apparatus comprising:
at least a first image processing circuit that is operative to generate a first rendered image frame corresponding with a single large surface, wherein the first image processing circuit is operative to provide a portion of the first rendered image frame for at least a first display and to provide a remaining portion of the first rendered image frame to at least a second image processing circuit; and
the second image processing circuit, operatively coupled to the first image processing circuit, operative to provide the remaining portion of the first rendered image frame for at least a second display, and operative to generate a second rendered image frame and to provide a first portion of the second rendered image frame for the second display and to provide a remaining portion of the second rendered image frame for the first display.

2. The apparatus of claim 1 wherein the first image processing circuit is operative to provide the remaining portion of the first rendered image frame after the second image processing circuit has presented a previous remaining portion of a previous rendered image frame corresponding with the single large surface for the second display.

3. The apparatus of claim 1 wherein the second image processing circuit is operative to generate the second rendered image frame concurrent with the first image processing circuit generating a third rendered image frame.

4. The apparatus of claim 1 wherein the first image processing circuit is operative to provide the portion of the first rendered image frame for the first display concurrently with the second image processing circuit providing the remaining portion of the first rendered image frame for the second display.

5. The apparatus of claim 1 wherein the first image processing circuit is operative to provide the portion of the first rendered image frame for the first display after the second image processing circuit receives the remaining portion of the first rendered image frame.

6. The apparatus of claim 1 wherein the first image processing circuit provides the portion of the first rendered image frame for a plurality of displays and wherein the second image processing circuit provides the remaining portion of the first rendered image frame to a second plurality of displays.

7. The apparatus of claim 6 comprising the first plurality of displays and the second plurality of displays operatively coupled to the first image processing circuit and the second image processing circuit respectively.

8. A method comprising:
generating, with at least a first image processing circuit, a first rendered image frame corresponding with a single large surface;
providing, with the first image processing circuit, a portion of the first rendered image frame for at least a first display;
providing a remaining portion of the first rendered image frame to at least a second image processing circuit;
providing the remaining portion of the first rendered image frame for at least a second display;
generating, with the second image processing circuit, a second rendered image frame;
providing, with the second image processing circuit, a first portion of the second rendered image frame for the second display; and
providing, with the second image processing circuit, a remaining portion of the second rendered image frame for the first display.

9. The method of claim 8 comprising providing the remaining portion of the first rendered image frame after the second image processing circuit has presented a previous remaining portion of a previous rendered image frame corresponding with the single large surface for the second display.

10. The method of claim 8 comprising generating, with the second image processing circuit, the second rendered image frame concurrent with the first image processing circuit generating a third rendered image frame.

11. The method of claim 8 comprising providing the portion of the first rendered image frame for the first display concurrently with providing the remaining portion of the first rendered image frame for the second display.

12. The method of claim 8 comprising providing the portion of the first rendered image frame for the first display after the second image processing circuit receives the remaining portion of the first rendered image frame.

13. The method of claim 8 comprising providing the portion of the first rendered image frame for a plurality of displays and providing the remaining portion of the first rendered image frame to a second plurality of displays.

14. A non-transitory computer readable medium comprising:
executable instructions stored therein that when executed by one or more image processing circuits, causes at least a first image processing circuit to:
generate a first rendered image frame corresponding with a single large surface;
provide a portion of the first rendered image frame for at least a first display; and provide a remaining portion of the first rendered image frame for a second image processing circuit;

wherein the executable instructions when executed by the one or more image processing circuits cause at least the second image processing circuit to:

provide the remaining portion of the first rendered image frame for a second display;

generate a second rendered image frame;

provide a first portion of the second rendered image frame for the second display; and provide a remaining portion of the second rendered image frame for the first display.

15. The computer readable medium of claim 14 comprising executable instructions that when executed cause the at least first image processing circuit to provide the remaining portion of the first rendered image frame after the at least second image processing circuit has presented a previous remaining portion of a previous rendered image frame corresponding with the single large surface for the second display.

16. The computer readable medium of claim 14 comprising executable instructions that when executed cause the at least second image processing circuit to generate the second rendered image frame concurrent with the first image processing circuit generating a third rendered image frame.

* * * * *